(12) United States Patent
Kondo et al.

(10) Patent No.: US 12,540,006 B2
(45) Date of Patent: Feb. 3, 2026

(54) PALLET AND MANUFACTURING METHOD THEREOF

(71) Applicant: TOHO INDUSTRIES CO., LTD, Osaka (JP)

(72) Inventors: Daisuke Kondo, Osaka (JP); Toru Oda, Osaka (JP); Toru Ibayashi, Osaka (JP); Hironori Nitta, Osaka (JP); Daichi Fukasawa, Osaka (JP)

(73) Assignee: TOHO INDUSTRIES CO., LTD, Osaka (JP)

( * ) Notice: Subject to any disclaimer, the term of this patent is extended or adjusted under 35 U.S.C. 154(b) by 839 days.

(21) Appl. No.: 16/630,737

(22) PCT Filed: Nov. 8, 2019

(86) PCT No.: PCT/JP2019/043974
§ 371 (c)(1),
(2) Date: Nov. 18, 2021

(87) PCT Pub. No.: WO2021/090498
PCT Pub. Date: May 14, 2021

(65) Prior Publication Data
US 2022/0073233 A1    Mar. 10, 2022

(51) Int. Cl.
*B29C 44/02* (2006.01)
*B29C 44/56* (2006.01)
(Continued)

(52) U.S. Cl.
CPC .......... *B65D 19/0028* (2013.01); *B29C 44/02* (2013.01); *B29C 44/5681* (2013.01);
(Continued)

(58) Field of Classification Search
CPC ......... B29C 51/10; B29C 51/14; B29C 51/18; B29C 51/26; B29C 51/12; B29C 51/267
See application file for complete search history.

(56) References Cited

U.S. PATENT DOCUMENTS 3,875,280 A * 4/1975 Story ...................... B29C 51/12
264/237
4,240,557 A   12/1980 Dickens
(Continued)

FOREIGN PATENT DOCUMENTS

| IT | 20120239 A | 11/2013 |
|----|-----------|---------|
| JP | 51-47161  | 1/1976  |

(Continued)

OTHER PUBLICATIONS

Extended European Search Report corresponding to European Application 19919566.0 dated Oct. 18, 2022.

*Primary Examiner* — Thu Khanh T. Nguyen
(74) *Attorney, Agent, or Firm* — Renner, Otto, Boisselle & Sklar, LLP

(57) ABSTRACT

In a pallet manufacturing method, variations of pallets, having different thicknesses of pallet bodies, heights of legs, or foaming ratios thereof, are manufactured at low cost and with high quality. The method includes a pallet body molding step for molding a plurality of the pallet bodies of a plurality of types having different thicknesses or expansion ratios of foaming; a leg molding step for molding, separately from the pallet body, a plurality of legs of a plurality of types having different heights or expansion ratios of foaming; and a vacuum forming step for forming a resin sheet for covering and integrating the pallet body and the legs from a bottom surface side of the pallet by vacuum integral forming after the pallet body and the legs are selected, respectively, from the plurality of types and assembled in a state that the legs are mounted on the pallet body.

6 Claims, 13 Drawing Sheets

(51) Int. Cl.
- B29C 51/10 (2006.01)
- B29C 51/12 (2006.01)
- B32B 3/08 (2006.01)
- B32B 3/30 (2006.01)
- B32B 5/18 (2006.01)
- B32B 27/06 (2006.01)
- B32B 27/30 (2006.01)
- B32B 37/00 (2006.01)
- B32B 37/10 (2006.01)
- B32B 37/18 (2006.01)
- B65D 19/00 (2006.01)
- B29K 25/00 (2006.01)
- B29L 31/00 (2006.01)

(52) U.S. Cl.
CPC ............ *B29C 44/569* (2013.01); *B29C 51/10* (2013.01); *B29C 51/12* (2013.01); *B32B 3/08* (2013.01); *B32B 3/30* (2013.01); *B32B 5/18* (2013.01); *B32B 27/065* (2013.01); *B32B 27/302* (2013.01); *B32B 37/0076* (2013.01); *B32B 37/1018* (2013.01); *B32B 37/182* (2013.01); *B29K 2025/06* (2013.01); *B29L 2031/7178* (2013.01); *B32B 2250/02* (2013.01); *B32B 2266/0228* (2013.01); *B32B 2305/022* (2013.01); *B32B 2325/00* (2013.01); *B32B 2553/00* (2013.01); *B65D 2519/00034* (2013.01); *B65D 2519/00069* (2013.01); *B65D 2519/00273* (2013.01); *B65D 2519/00288* (2013.01); *B65D 2519/00323* (2013.01); *B65D 2519/00338* (2013.01); *B65D 2519/00562* (2013.01)

(56) References Cited

U.S. PATENT DOCUMENTS

| | | | |
|---|---|---|---|
| 9,919,835 B2* | 3/2018 | Brisendine | B65D 19/0018 |
| 2010/0186639 A1* | 7/2010 | Schiava | B29C 51/16 |
| | | | 248/346.02 |
| 2013/0133557 A1* | 5/2013 | Yoshinaga | B29C 44/08 |
| | | | 108/57.25 |
| 2014/0113092 A1* | 4/2014 | Doll | B29C 51/12 |
| | | | 428/36.5 |
| 2017/0239860 A1 | 8/2017 | Ni et al. | |

FOREIGN PATENT DOCUMENTS

| | | |
|---|---|---|
| JP | 05-65836 U | 8/1993 |
| JP | 06-076052 U | 10/1994 |
| JP | 3047236 U | 4/1998 |
| JP | 10-230937 | 9/1998 |
| JP | 2003-072754 A | 3/2003 |
| JP | 2007-176533 A | 7/2007 |
| JP | 2007-176534 A | 7/2007 |
| JP | 2013-518001 A | 5/2013 |
| JP | 2019-112067 A | 7/2019 |

* cited by examiner

PALLET AND MANUFACTURING METHOD THEREOF

FIELD OF THE INVENTION

The present invention relates to a pallet and a method for manufacturing the pallet, which is made of foamed resin, such as expanded polystyrene, and used for transporting goods using a forklift, a hand-drawn pallet jack or the like.

DESCRIPTION OF THE RELATED ART

Conventionally, various pallets have been widely used as goods carrying platforms when carrying goods by forklifts or hand-drawn pallet jacks. For example, when transporting goods by a forklift or the like at a logistics site, the goods are loaded on a loading surface of the pallet, the fork of the forklift is inserted into the fork insertion port on the side of the pallet, and the pallet is lifted to a predetermined height position. After conveying the pallet to a destination by operating the forklift, the fork is lowered, the pallet is placed on the destination, and the fork is extracted from the fork insertion port.

As general pallets, wooden, plastic, metal (iron alloy) or paper pallets are known. However, each of many common pallets has large weight, for example, the wooden pallet weighs 10 kg or more, and even though the paper pallet is lighter than the plastic or metal pallet, such a paper pallet has a considerable weight because it is made through compression forming to have high density to ensure its shape stability.

Related to the above, a pallet made of foamed resin is known as a lighter pallet than the paper pallet (see, for example, Patent Document 1). However, the pallet made of foamed resin has fine irregularities on the surface due to the foamed beads, and there is a problem that the surface is fragile and rough compared to a pallet made of wood or plastic. Then, such a resin pallet that the surface of the pallet body is covered with a resin sheet for reinforcement is known (for example, refer Patent Document 2).

Each of the foamed beads constituting the foamed resin pallet contains air in its almost entire volume, and therefore has low thermal conductivity and moderate elasticity. Therefore, the pallet made of foamed resin has a thermal insulation performance, and insulates the heat from a road surface and a warehouse floor, etc. so as not to be transferred to the pallet, and also since the pallet made of foamed resin has a cushioning property unique to foamed resin, goods-conveyed can be protected from shocks.

PRIOR ART DOCUMENTS

Patent Documents

Patent Document 1: Japanese Laid-Open Patent Publication 2003-072754

Patent Document 2: Japanese Laid-Open Patent Publication 2007-176534

In the case of a pallet made of foamed resin, when goods to be loaded is heavy, at least a predetermined thickness (for example, 100 mm or more) is required for the pallet body (top plate portion) so as to withstand the load. On the other hand, if the pallet body is unnecessarily thick, the height increase of the pallet itself (pallet volume increase) diminishes the loadable capacity on the pallet because of the height limit of the entrance into containers or trucks, and finally affects the loadable capacity (loading efficiency) of the containers or trucks in which the pallets remain with goods, and causes economic losses during goods distribution. Therefore, when the goods to be loaded is not heavy, the thickness of the pallet body may be reduced. In addition, for example, when the goods to be conveyed requires being kept cold such as agricultural products, a pallet having high legs may be used in order to decrease the heat transmitted to the goods-conveyed from the floor (road surface). On the other hand, if the legs are high, the height of the conveyed goods is suppressed due to the restriction on the height of the container entrance. Therefore, in the case of goods that does not require cooling, the height of the legs may be low. Furthermore, a pallet loaded with goods is conveyed using forks of a forklift or a handlift and the height level of the forks is various, and therefore various leg heights corresponding to the forks' height are required.

Thus, the appropriateness of the thickness of the pallet body and the height of the legs varies according to the characteristics of the goods to be conveyed. In general, a pallet made of a foamed resin has a dimension of 1000 mm wide or more, and is formed using a large and expensive mold. However, to manufacture pallets of a plurality of variations, it is necessary to prepare each mold for each type, and thus this increases the manufacturing cost of the pallet, and may not be able to provide the pallet at a reasonable price.

Also, even if a pallet is relatively thin, a pallet generally has a considerable thickness from the top surface of the pallet body to the bottom surface of the legs, and the molding depth in the mold is large. The foamed resin product is molded through the steps by filling a mold with prefoamed beads, heating the prefoamed beads to further expand them with steam, fusing the beads together, and then cooling in vacuum. However, if the molding depth is large, the steam can not reach the inside uniformly, and uneven heating may occur and also poor fusion may occur, furthermore, because of the deteriorated cooling efficiency, swelling due to insufficient cooling may occur. As a result, the quality of the molded product may be reduced, for example, the strength may be lowered.

In addition, the thermal insulation performance and the cushioning property of the foamed resin can be attained to an optimum required level by adjusting the expansion ratio in the molding. For example, if the expansion ratio is increased, the thermal insulation performance and the cushioning property are improved. However, in order to secure a predetermined load resistance, it is necessary to have a sufficient thickness, which affects the loading capacity of the container or the like. Therefore, in the case of the pallet made of foamed resin, it is necessary to appropriately change the expansion ratio in accordance with not only the thickness of the pallet body and the height of the legs but also the use.

The present invention has been made in view of the above-mentioned problems, and it is an object of the present invention to provide a method for manufacturing a pallet that can manufacture a plurality of variations of pallets having different thicknesses, leg heights, and expansion ratios according to the application at a reasonable price and high quality, and to provide a pallet manufactured by the manufacturing method.

SUMMARY OF THE INVENTION

In order to solve the above problems, the present invention provides a method for manufacturing a pallet having a plate-like pallet body made of foamed resin and a plurality of legs provided on a bottom surface of the pallet body, the method comprising: a pallet body molding step for molding a plurality of the pallet bodies of a plurality of types having different thicknesses or expansion ratios of foaming; a leg molding step for molding, separately from the pallet body, a plurality of legs of a plurality of types having different heights or expansion ratios of foaming; and a vacuum forming step for forming a resin sheet for covering and integrating the pallet body and the legs from a bottom surface side of the pallet by vacuum integral forming after the pallet body and the legs are selected, respectively, from the plurality of types and assembled in a state that the legs are mounted on the pallet body.

In the method for manufacturing a pallet, it is preferable that in the pallet body molding step, a plurality of fitting convex are formed on the bottom surface of the pallet body, and in the leg molding step, a fitting concave that fits with the fitting convex is formed on a top surface of the leg.

In the method for manufacturing a pallet, it is preferable that in the pallet body molding step, a loading surface on which goods-conveyed is loaded is formed on a top surface of the pallet body, and a step portion is formed in a shape of down-step from the outer peripheral edge of the loading surface to side surfaces of the pallet body, and in the vacuum forming step, the bottom surface of the pallet body, the legs, the side surfaces of the pallet body and the step portion are covered with the resin sheet, wherein the loading surface is not covered with the resin sheet.

In the method for manufacturing a pallet, it is preferable that in the pallet body molding step, an exhaust hole is formed on the bottom surface of the pallet body in a thickness direction of the pallet body at a place where the leg is arranged.

In the method for manufacturing a pallet, it is preferable that in the leg molding step, a needle hole penetrating to the bottom surface of the leg is formed at the bottom of the fitting concave.

The present invention provides a pallet manufactured by the method for manufacturing a pallet described above.

According to the method for manufacturing a pallet according to the present invention, since the pallet body and the legs are molded separately, many variations of pallets different in thicknesses or expansion ratios of the pallet bodies and different in heights or expansion ratios of the legs can be manufactured with fewer types of molds compared to the case where the pallet body and the legs are integrally molded. Therefore, pallets of variations can be manufactured at low cost according to each application. In addition, since the molding depth in the mold can be reduced, the steam is easily distributed uniformly to the inside during molding of each member, uneven heating is unlikely to occur, and poor fusion hardly occurs. As a result, it is possible to prevent a decrease in the strength of the molded product and it is possible to manufacture a high-quality pallet.

MODE FOR CARRYING OUT THE INVENTION

Figure 1A:
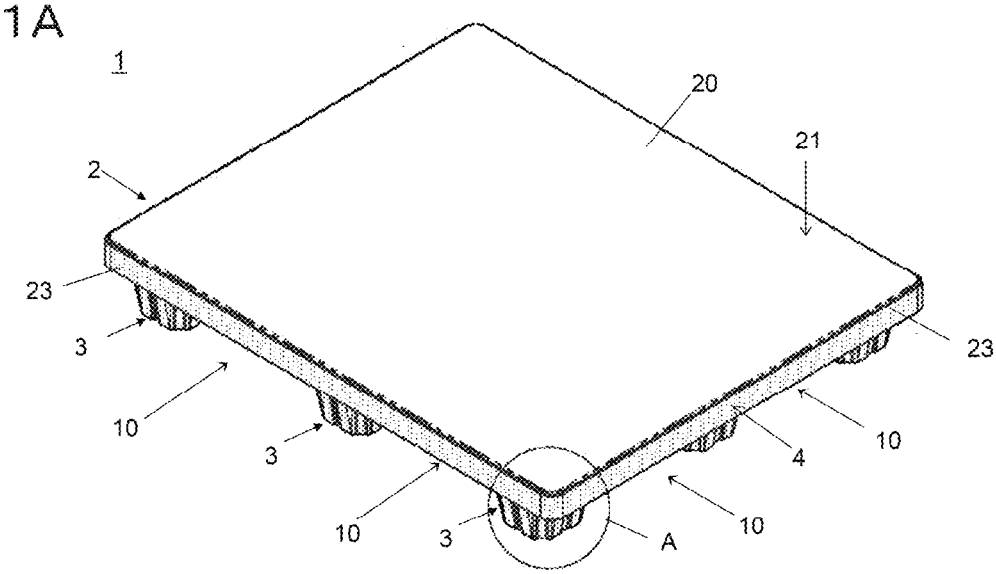
FIG. 1A is a perspective view mainly showing a top surface of a pallet according to an embodiment of the present invention.
Figure 1B:
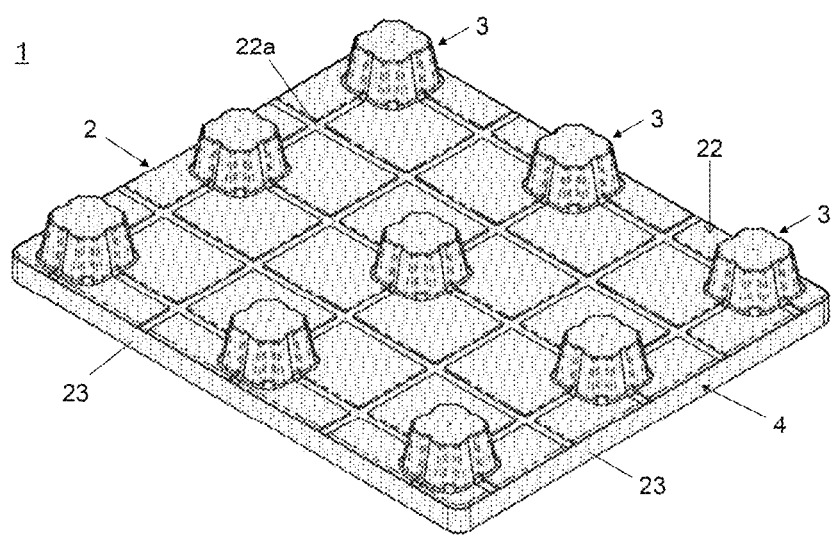
FIG. 1B is a perspective view mainly showing a bottom surface of the pallet.
Figure 1C:
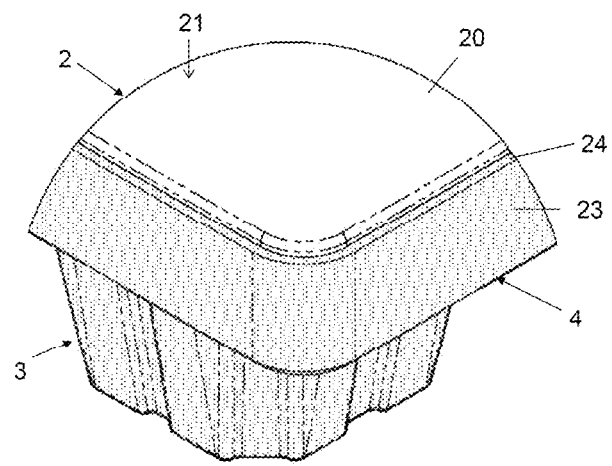
FIG. 1C is a enlarged view of the region A in FIG. 1A.

A pallet according to an embodiment of the present invention will be described with reference to the drawings. As shown in FIG. 1A to FIG. 1C, FIG. 2, FIG. 3A to FIG. 3C and FIG. 4A and FIG. 4B, the pallet 1 of this embodiment can be preferably used for the management and transportation of goods using a forklift, a hand-drawn pallet jack or the like at a distribution site or the like. In the following description, the left front side of the pallet 1 shown in FIG. 1A is referred to as the front, and the right front side of the pallet 1 is referred to as the right side.

Figure 2:
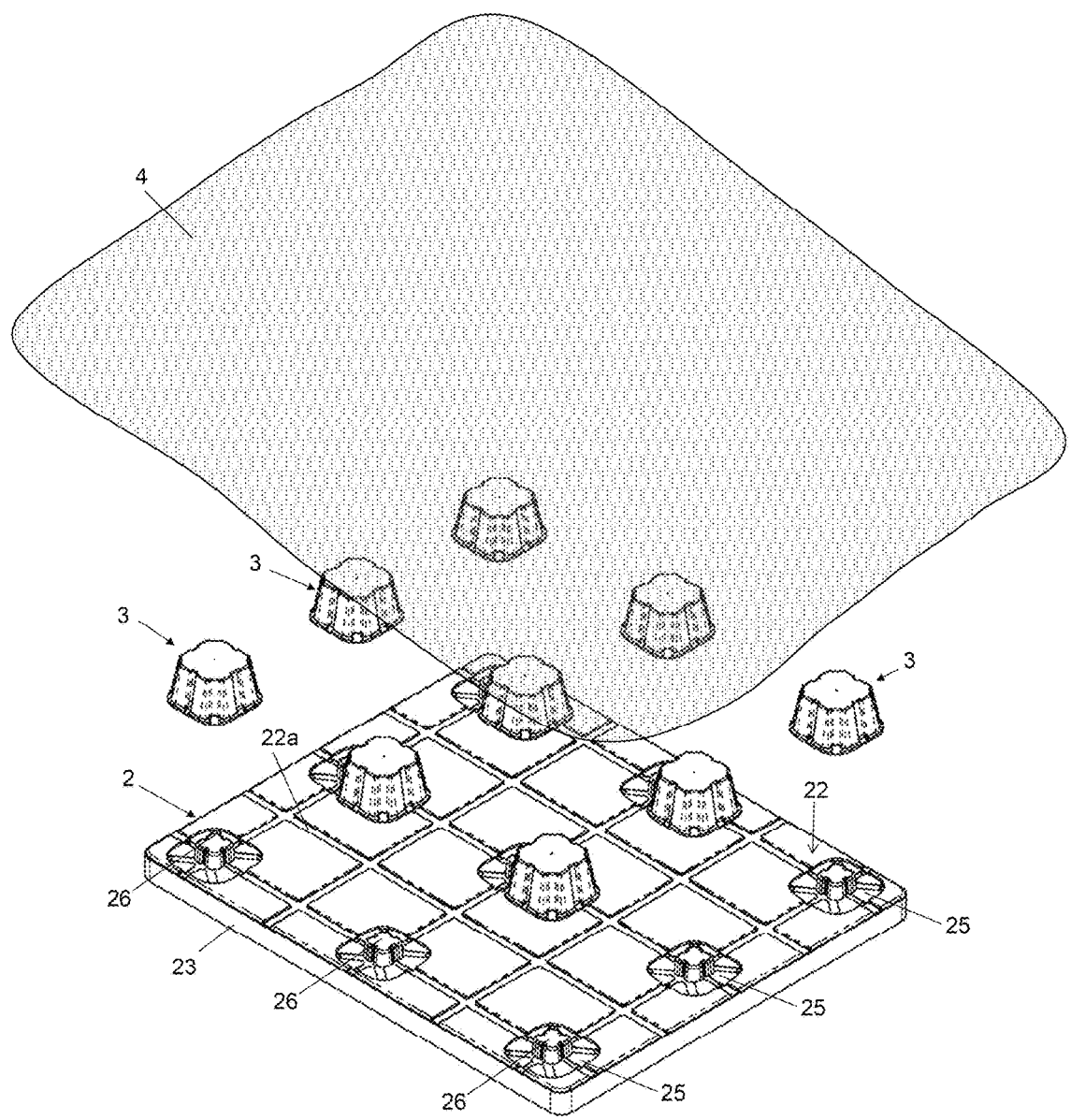
FIG. 2 is an exploded perspective view mainly showing the bottom surface of the pallet.
Figure 3A:
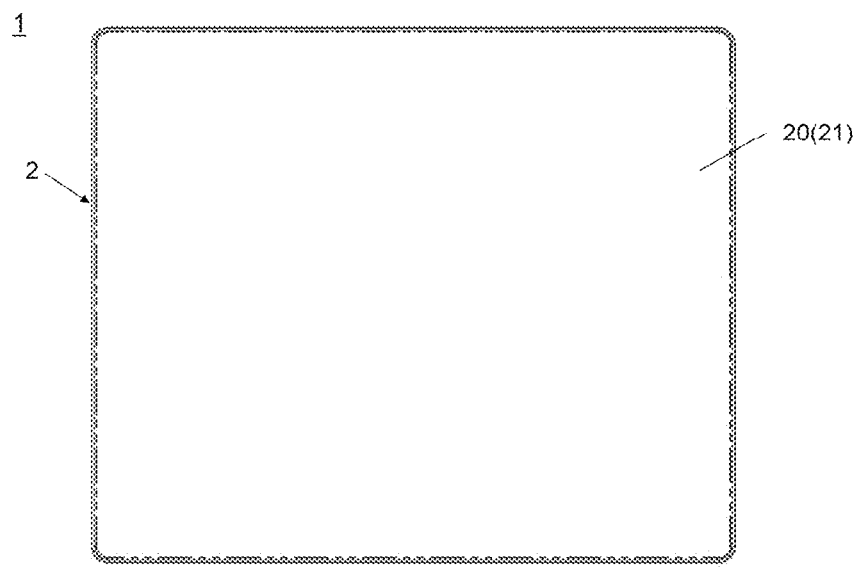
FIG. 3A is a plan view of the pallet.
Figure 3B:
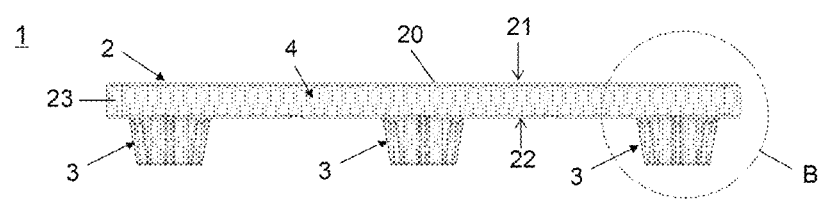
FIG. 3B is a side view.
Figure 3C:
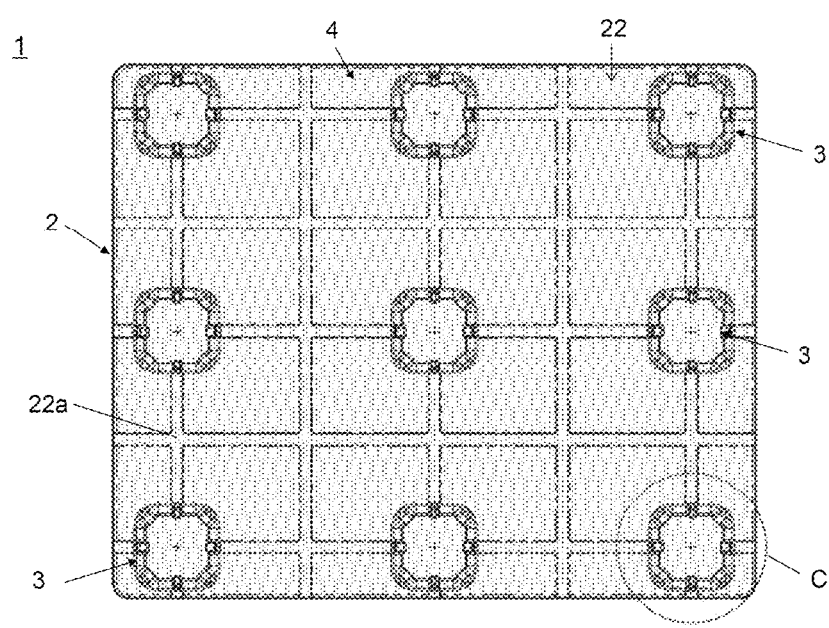
FIG. 3C is a bottom view.

The pallet 1 comprises a plate-like pallet body 2 made of foamed resin, a plurality of legs 3 provided on the bottom surface of the pallet body 2, and a resin sheet 4 that covers the outer surfaces of the pallet body 2 and the legs 3 (see FIG. 2). The plurality of legs 3 are arranged in a lattice pattern at predetermined intervals on the bottom surface of the pallet body 2. In this example, nine legs 3 of 3×3 are provided, each of which has a box-like shape with a substantially square projected area in plan view. In the illustrated example, the resin sheet 4 is shown in gray for convenience of explanation, but the resin sheet 4 may be transparent or the same white as the pallet body 2.

The leg 3 is a support member that raises the height of the top surface 21 serving as the loading surface 20, and the plurality of legs 3 are arranged at predetermined intervals from the adjacent legs 3, thereby the fork insertion portion 10 into which a fork is inserted is formed (FIG. 1A). In this example, the structure of the pallet 1 of so-called four-way insertion is shown, in which the fork insertion portion 10 is formed between the legs 3 on both sides and the legs 3 on center, and the fork insertion portions are opened on four sides, namely, left, right, front and back sides, thus four insertion directions are available. In addition, for example, legs each of which has a long box-like shape with a substantially rectangular projected area in plan view may be provided in a three-row arrangement, and so-called two-way insertion may be possible.

The pallet body 2 and the legs 3 are molded as separate parts. The material constituting the pallet body 2 is, for example, a foamed synthetic resin such as a polyolefin-based resin such as polystyrene, polyethylene, or polypropylene, and in the present embodiment, foamed polystyrene (EPS: expanded polystyrene) is used. The material constituting the legs 3 is preferably the same as that of the pallet body 2, but a material different in density and hardness from the pallet body 2 may be used, or another material may be used.

Figure 4A:
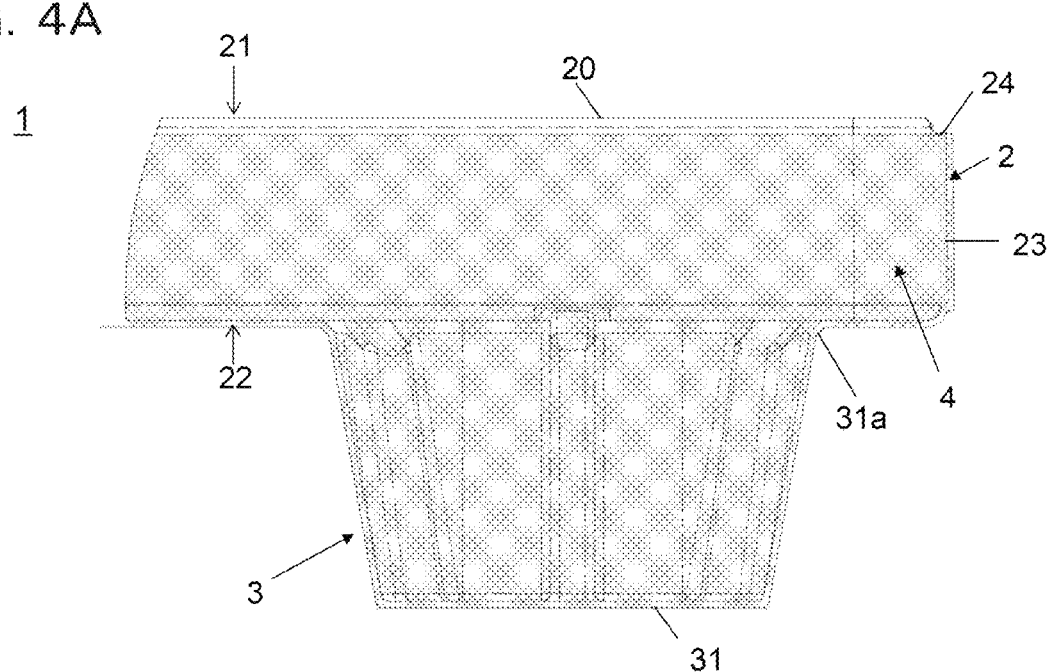
FIG. 4A is an enlarged view of the region B in FIG. 3B.
Figure 4B:
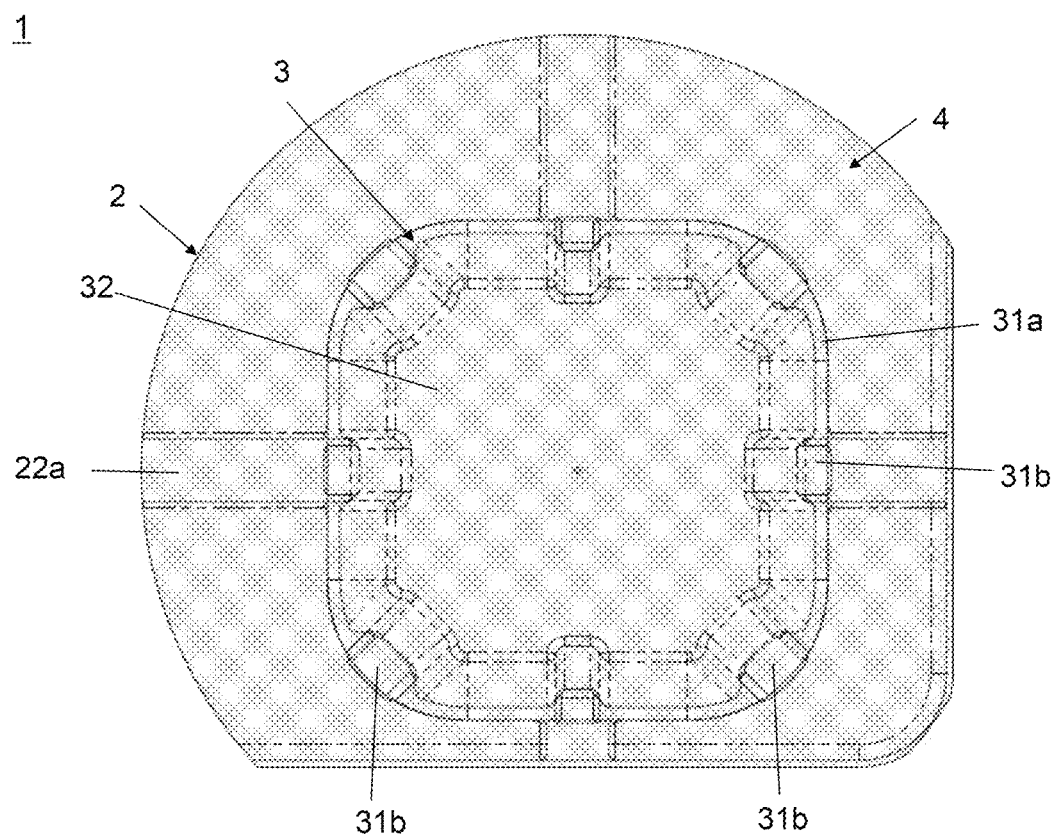
FIG. 4B is the enlarged view of the region C in FIG. 3C.
Figure 5A:
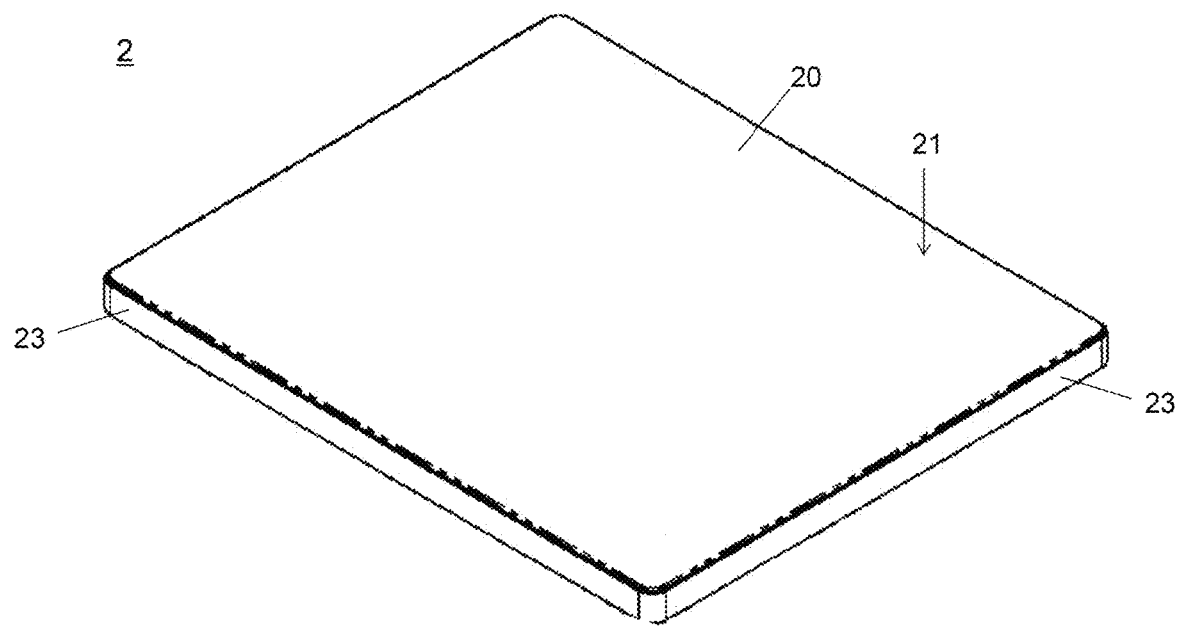
FIG. 5A is a perspective view mainly showing the top surface of a pallet body used in the pallet.
Figure 5B:
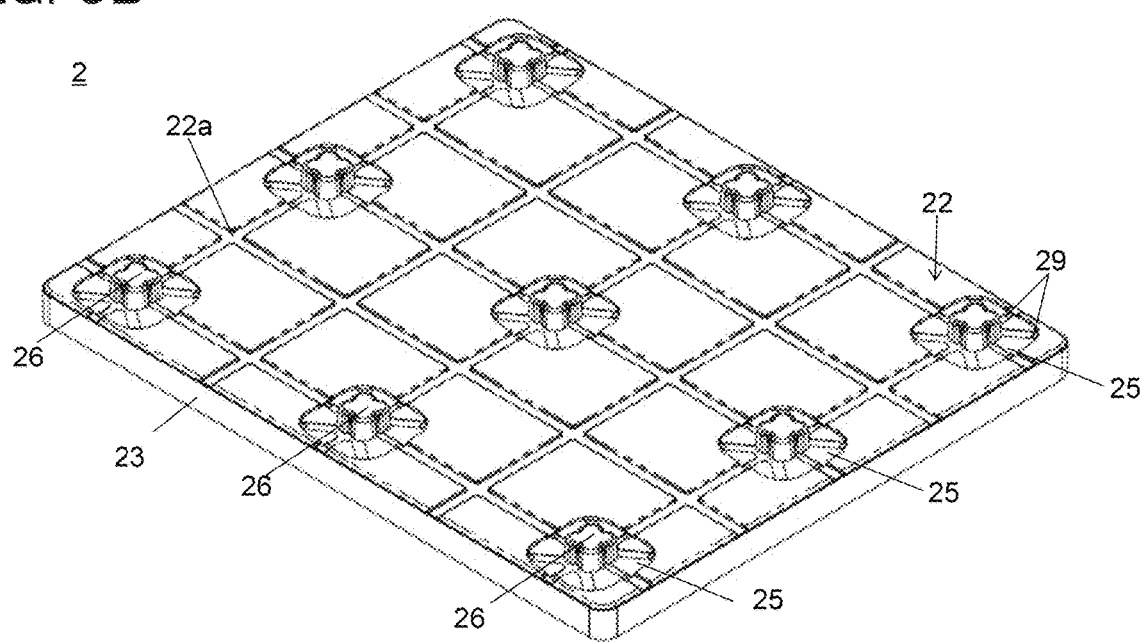
FIG. 5B is a perspective view mainly showing a bottom surface of the pallet body.

As shown in FIG. 4A and FIG. 4B, the resin sheet 4 covers the bottom surface 22 of the pallet body 2, the legs 3, the side surface 23 of the pallet body 2, and a step portion described later. Since the legs 3 are covered with the resin sheet 4 together with the bottom surface 22 of the pallet body 2, they are more firmly fixed to the pallet body 2.

Figure 6A:
FIG. 6A is a plan view of the pallet body.
Figure 6B:
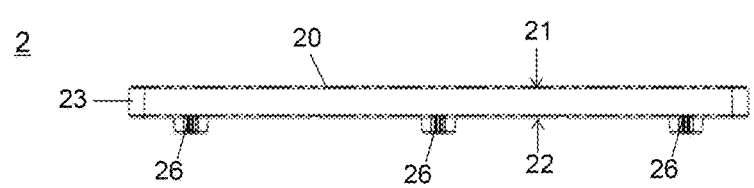
FIG. 6B is a front view.
Figure 6C:
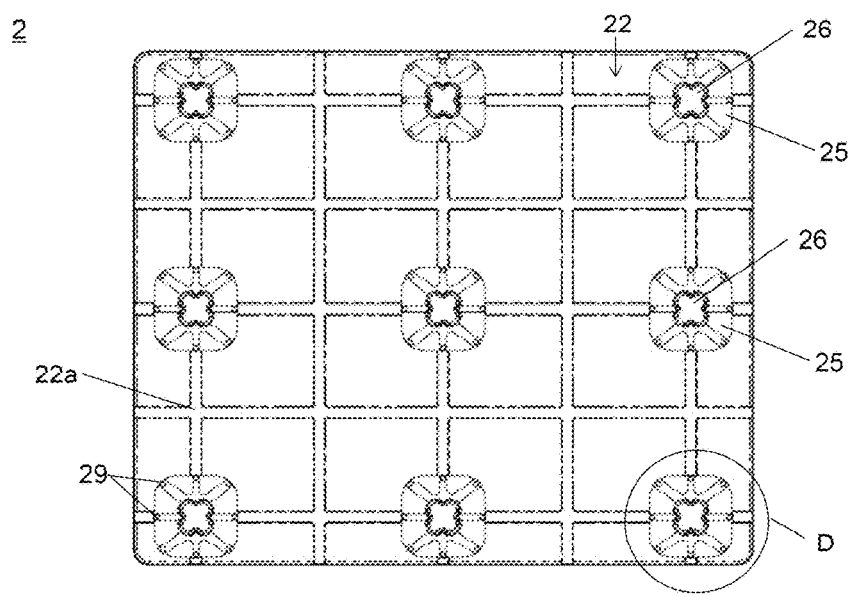
FIG. 6C is a bottom view.
Figure 6D:
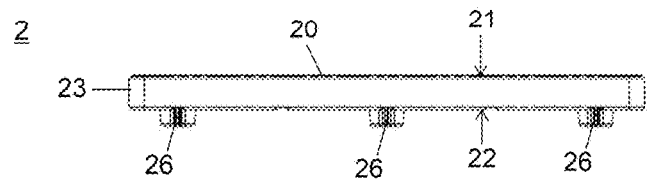
FIG. 6D is a side view.

As shown in FIG. 5A and FIG. 5B and FIG. 6A and FIG. 6D, the pallet body 2 is a plate-like member having a predetermined thickness and having a rectangular shape in plan view. The pallet body 2 of the present example is formed so that the width on the front side (FIG. 6B) is slightly larger than the width on the side surface (FIG. 6D), but this is not limitative, instead, the shape of the pallet body 2 may be appropriately selected from various shapes including a polygonal shape in plan view. The pallet body 2 comprises the top surface 21 having a loading surface 20 on which goods is loaded, the bottom surface 22 on which the legs 3 are provided, and the side surface 23 connecting the top surface 21 and the bottom surface 22. The outer dimensions of the top surface 21 and the bottom surface 22 are substantially equal, and the corners made of the side surfaces 23 are chamfered so as to be rounded (see also FIG. 1C).

On the top surface 21 of the pallet body 2, the step portion 24 is provided, which is formed in a shape down-step from the outer peripheral edge of the loading surface 20, on which the goods-conveyed is placed, to the side surface 23 of the pallet body 2 (see FIG. 4A). The step portion 24 is formed in a region having a width of about 1 to 15 mm from the outer peripheral edge (ridge line portion with the side surface 23) of the top surface 21 toward the inside. When the width of the step portion 24 is too large, the loading surface 20 becomes unnecessarily narrow, and when the width of the step portion 24 is too small, the resin sheet 4 becomes insufficiently wound as described later. Further, the depth of the step portion 24 (step difference from the loading surface 20) is preferably 2 to 15 mm. If the step portion 24 is too shallow, the resin sheet 4 may not accurately cover the step portion 24, and if the step portion 24 is too deep, surface strength will decrease, because exposed area of the foamed resin in the peripheral edge portion of the loading surface 20 increases. The ridge line portion between the step portion 24 and the loading surface 20 is chamfered so as to be a curved surface (see also FIG. 7B).

The surface of the bottom surface 22 of the pallet body 2 is provided with the grooves 22a formed in a lattice shape in order to prevent the inserted fork from slipping. Further, the bottom surface 22 of the pallet body 2 has the fitting concaves 25 in which the legs 3 are fitted. Each of the fitting concaves 25 is formed so that its inner dimension is substantially equal to the outer dimension of the top surface (joint surface 31) of the leg 3.

Figure 7A:
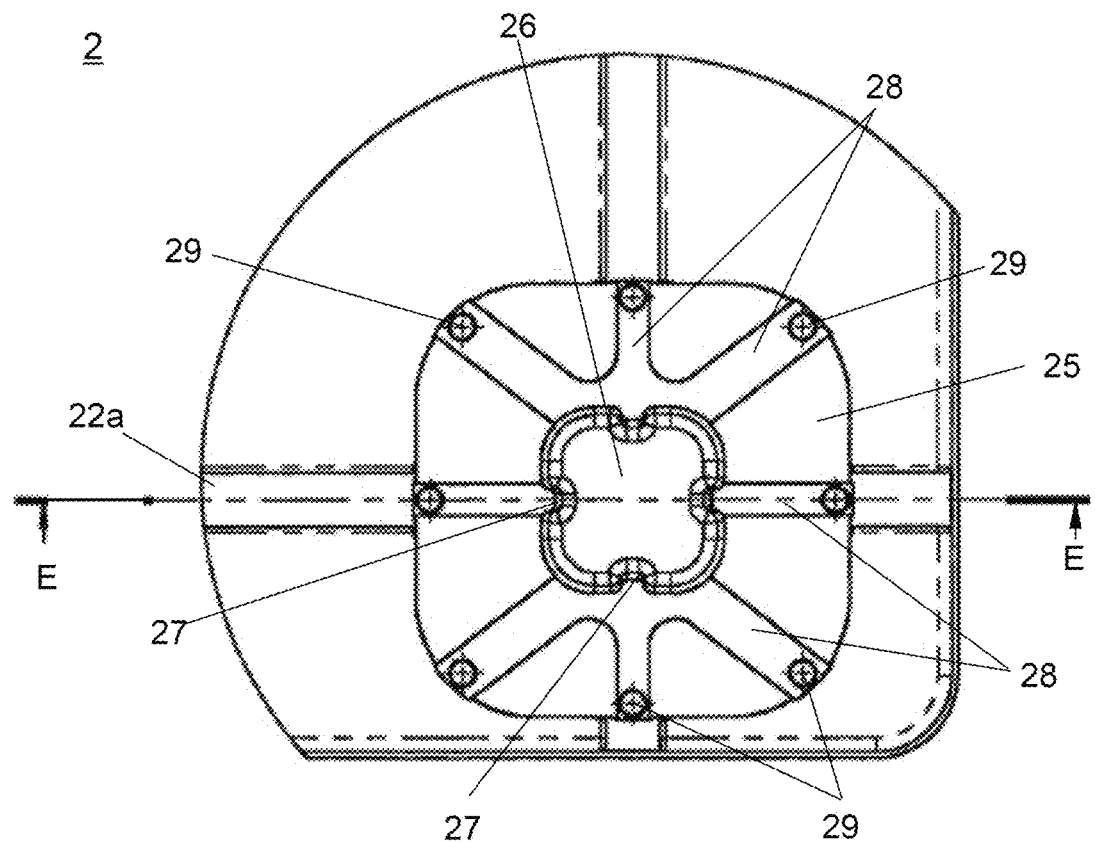
FIG. 7A is an enlarged view of the region D in FIG. 6C.
Figure 8A:
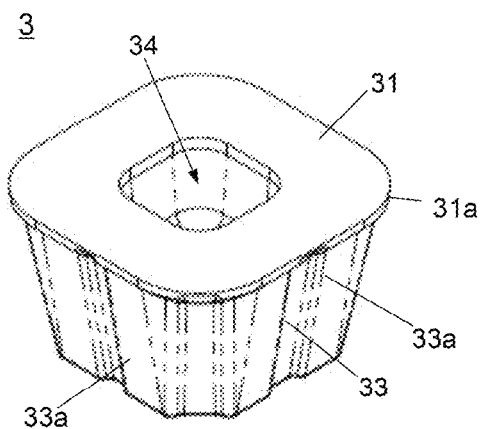
FIG. 8A is a perspective view mainly showing the top surface of the leg used in the pallet.
Figure 8B:
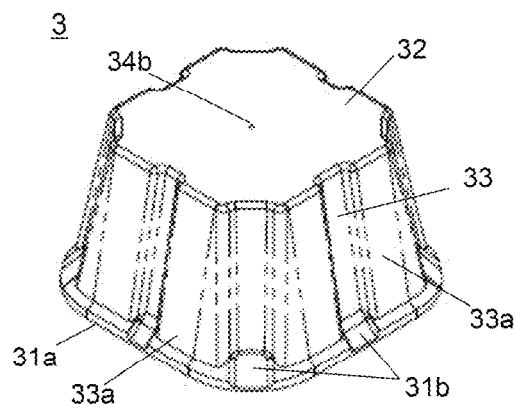
FIG. 8B is a perspective view mainly showing the bottom surface of the leg.
Figure 8C:
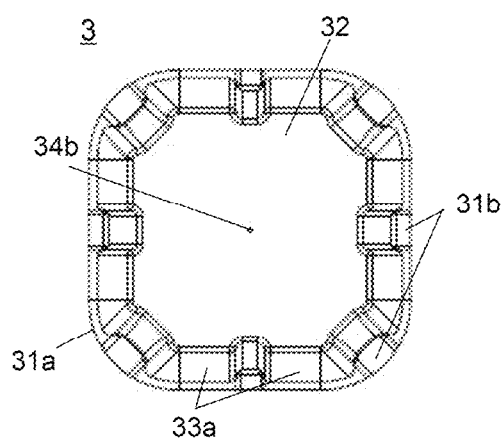
FIG. 8C is a bottom view of the leg.
Figure 8D:
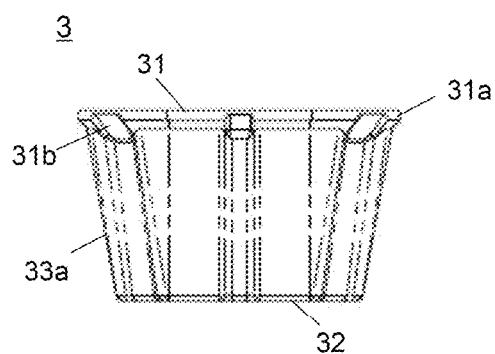
FIG. 8D is a side view.
Figure 8E:
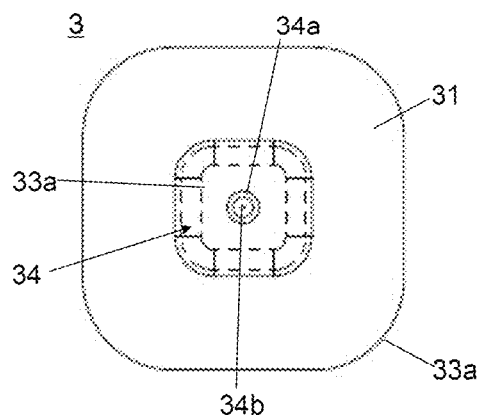
FIG. 8E is a plan view.
Figure 8F:
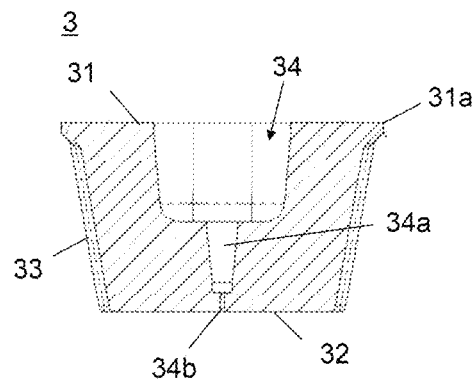
FIG. 8F is a side sectional view.

As shown in FIG. 7A, in the fitting concave 25 at the center thereof, the fitting convex 26 is formed, which is fitted with the fitting concave 34 formed on the top surface of the leg 3 (see FIG. 8A and FIG. 8F). The fitting convex 26 is a trapezoidal protrusion whose top portion is slightly smaller than the bottom portion, and the vertical grooves 27 are formed on the four side surfaces thereof, and also the ventilation grooves 28 are formed on the bottom surface of the fitting concave 25 radially from the convex 26 at the center. In this example, the ventilation grooves 28 are formed so as to extend in eight directions around the fitting convex 26. Further, the longitudinal grooves 27 formed on the four side surfaces of the fitting convex 26 are connected to the ventilation groove 28 on the bottom surface of the fitting concave 25.

Figure 7B:
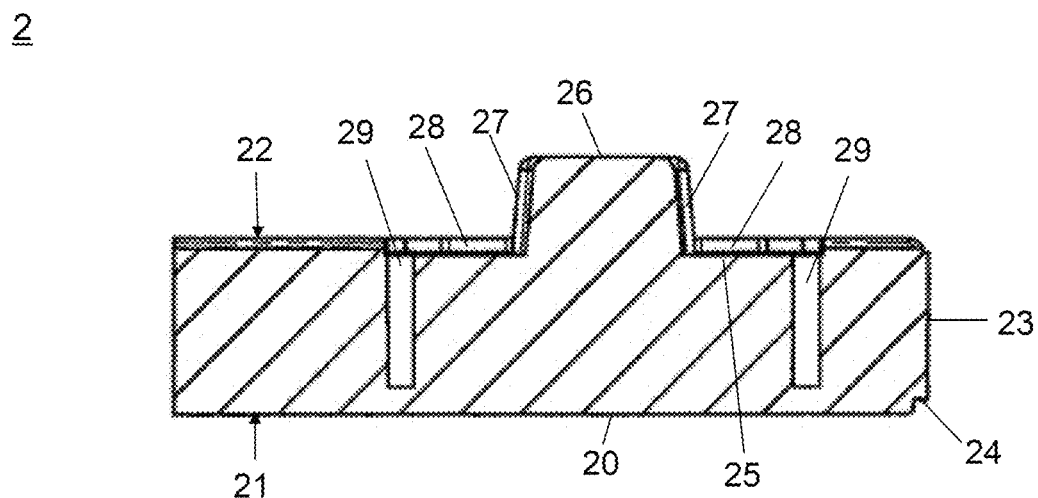
FIG. 7B is a sectional view taken along the line E-E in FIG. 7A.

Also, the plurality of exhaust holes 29 carved in the thickness direction of the pallet body are made on the bottom surface of the fitting concave 25. The exhaust holes 29 are provided at the outer periphery of the ventilation grooves 28 at the periphery of the fitting concave 25. As shown in FIG. 7B, the exhaust holes 29 does not penetrate to the top surface 21 of the pallet body 2, and a predetermined thickness is ensured from the bottom of the exhaust holes 29 to the top surface 21 of the pallet body 2. The thickness is preferably 5 mm or more, and particularly preferably 5 to 15 mm, for example. However, for the vacuum forming step of the resin sheet 4 described later, the thickness is desirably 15 mm or less.

As shown in FIG. 8A to FIG. 8F, the leg 3 includes the joint surface 31 joined to the pallet body 2, the installation surface 32 serving as a bottom surface when the pallet 1 is placed, and the side surface 33 distributed between the joint surface 31 and the installation surface 32. In the leg 3 of this embodiment, the joint surface 31 and the installation surface 32 have a substantially rectangular shape in plan view, and the leg 3 has a block shape with four side surfaces 33. The four side surfaces 33 have the same shape, and only one side surface is shown in FIG. 8D.

The leg 3 is formed so that the joint surface 31 is slightly larger than the installation surface 32, and the side surface 33 between them is slightly inclined. The joint surface 31 has the flange 31a that slightly extends outward. The flange 31a is fitted into the fitting concave 25 of the pallet body 2, and the bottom surface 22 of the pallet body 2 and the side surface 33 of the leg 3 are connected to the flange 31a at a moderate angle. Moreover, the flange 31a has the thin part 31b with slightly thin thickness at the location where the flange 31a faces the ventilation groove 28 in planar view.

The joint surface 31 of the leg 3 is provided with the fitting concave 34 into which the fitting convex 26 of the pallet body 2 is fitted. The fitting concave 34 is formed so that its inner dimension is substantially equal to the outer dimension of the fitting convex 26 of the pallet body 2. The fitting concave 34 is formed so that its depth is deeper than the height of the fitting convex 26. In the bottom of the fitting concave 34, the round hole 34a is formed, and further the needle hole 34b penetrating to the installation surface 32 of the leg 3 is formed in the bottom of the round hole 34a. Therefore, the fitting concave 34 communicates with the outside, namely, the installation surface 32 side of the leg 3 through the round hole 34a and the needle hole 34b. Further, when the leg 3 is attached to the pallet body 2, the fitting concave 34 communicates also with the exhaust holes 29 through the vertical grooves 27 on the four side surfaces of the fitting convex 26 and the ventilation grooves 28 on the bottom surface of the fitting concave 25.

The height of the side surface 33 of the leg 3 is designed so that the raised amount of the loading surface 20 becomes a desired value. In addition, a plurality of ribs 33a are formed in the side surface 33 in the vertical direction to improve strength. It should be noted that on the installation surface 32 of the leg 3 except for the vicinity of the needle hole 34b, a cover or the like (not shown) made of curable resin, wood, metal etc. may be attached in order to prevent the deterioration of the foamed polystyrene and the generation of debris due to a plurality of conveyances using a forklift. In addition, the leg 3 is not limited to the illustrated shape, and may be, for example, an elliptical column shape or a polygonal column shape other than such a quadrangular column.

The resin sheet 4 is a sheet member that is softened and deformed by heating, cured at room temperature, and has sufficient strength and surface durability against a heavy object placed thereon. As the material of the resin sheet 4 of the present embodiment, a resin material made of the same compound as the pallet body 2 is preferably used. When the pallet body 2 and the legs 3 are made of the abovementioned expanded polystyrene, for example, a high-impact polystyrene (HIPS) sheet is used as the resin sheet 4.

Here, a method for manufacturing a pallet according to an embodiment of the present invention will be described. The method for manufacturing a pallet according to the present embodiment comprises: a pallet body molding step for molding the pallet bodies 2 of a plurality of types having different thicknesses or expansion ratios of foaming; a leg molding step for molding the legs 3 of a plurality of types having different heights or expansion ratios of foaming, separately from the pallet body; and a vacuum forming step for forming a resin sheet 4 for covering and integrating the pallet body 2 and the legs 3 from a bottom surface side of the pallet 1 by vacuum integral forming after the pallet body and the legs are selected, respectively, from the plurality of types and assembled in a state that the legs are mounted on the pallet body.

In the pallet body molding step, the pallet body 2 is molded by a predetermined mold. The thickness of the pallet body 2 formed in the pallet body forming step is appropriately set, for example, in a range of 45 mm to 150 mm. Further, the expansion ratio of foaming for the pallet body 2 is appropriately set within a range of approximately 20 to 60 times.

Here, the "expansion ratio of foaming" means the reciprocal of the density (g/cc) of the molded article after foaming relative to the density of polystyrene as a raw material being set a reference value of 1. For example, if the density relative to polystyrene is 0.02 g/cc, the expansion ratio is 50 times (=1/0.02), and if the density is 0.025 g/cc, the expansion ratio is 40 times (=1/0.025). The expansion ratio is the same as the "bulk density" at the time of preliminary expansion (primary expansion) defined with respect to the inner volume of the mold. The foamed beads that have been prefoamed have voids between the bead particles at the stage filled in the mold, and the voids disappear in the heating step using steam in the molding process (secondary foaming), since a certain definite weight of raw material is filled in a certain definite volume and foamed therein, the density after the molding is the same as the bulk density after preliminary foaming.

The expansion ratio of the pallet body 2 is determined in consideration of the relationship with the thickness. For example, a pallets 1 having a pallet body 2 of thickness 135 mm (thick type) and foaming ratio 60 times (high expansion), and another pallet 1 having a pallet body 2 of foaming ratio 20 times (low expansion) and thickness 45 mm (thin) have the same weight mutually, however the latter has increased strength and lower height, and the latter is preferable in a view point that the loading capacity of the container or the like is less affected. Further, for example, the thickness of the pallet body 2 is set to 45 mm (thin) and the expansion ratio is set to 40 times (medium expansion), or the thickness of the pallet body 2 is set to 150 mm (thick type) and the expansion ratio is set to 60 times (high expansion). In this way, it is possible to realize an optimal combination minimizing the impact on the goods-conveyed while maintaining the strength of the pallet 1.

Figure 9A:
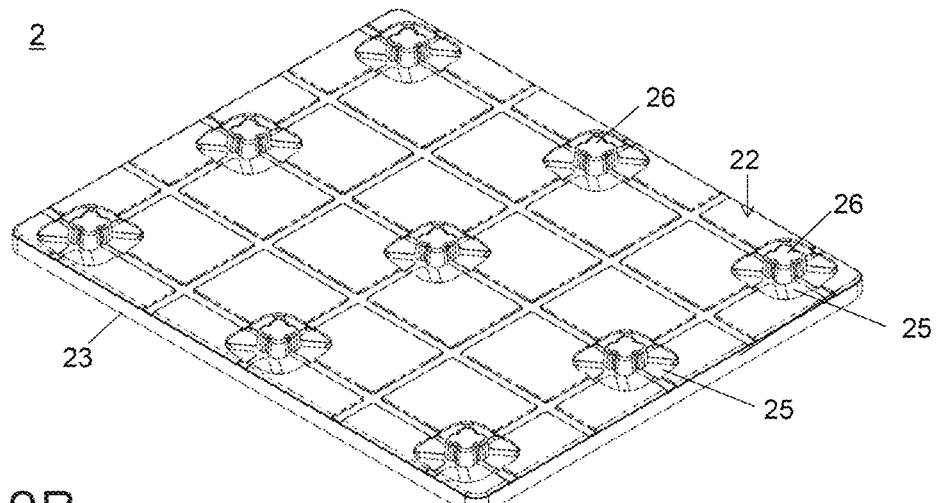
FIG. 9A is a perspective view of a pallet body of thin type.
Figure 9B:
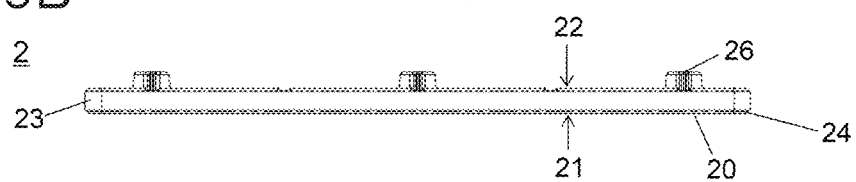
FIG. 9B is a front view.
Figure 9C:
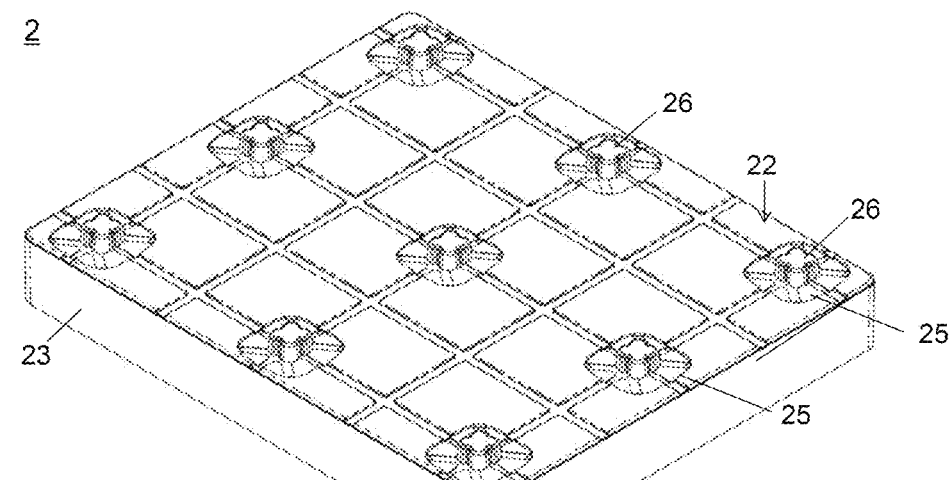
FIG. 9C is a perspective view of a pallet body of thick type.
Figure 9D:
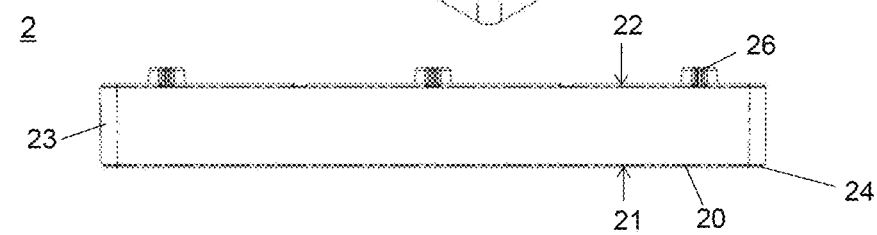
FIG. 9D is a front view.

Not only the standard type pallet body 2 having a thickness (for example, 100 mm) shown in FIG. 6, but also a thin type (for example, 45 mm) as shown in FIGS. 9A, 9B, and also a thick type (for example, 150 mm) as shown in FIGS. 9C, 9D are molded using respective mold by changing their expansion ratio to make optimum. In the molding during the pallet body molding step, a plurality of fitting convex 26 are formed on the bottom surface of the pallet body 2, and also the exhaust hole 29 carved in the thickness direction of the pallet body is formed at each position on the bottom surface of the pallet body 2 where the legs 3 are attached. On the top surface of the pallet body 2, the loading surface 21 on which a goods-conveyed is loaded and the step portion 24 in a shape of down-step from the outer peripheral edge of the loading surface 21 to the side surfaces of the pallet body 2 are formed.

Figure 10A:
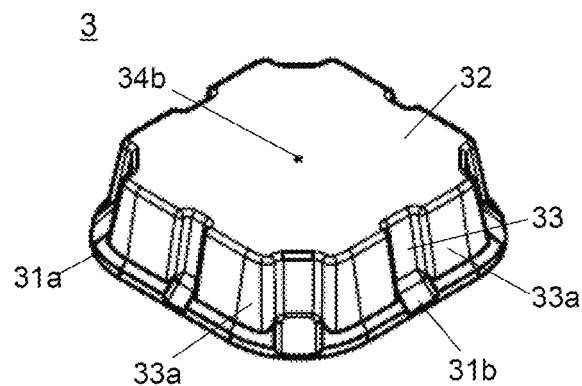
FIG. 10A is a perspective view of a leg of low leg type.
Figure 10B:
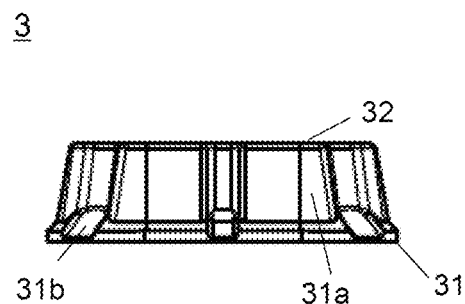
FIG. 10B is a front view.
Figure 10C:
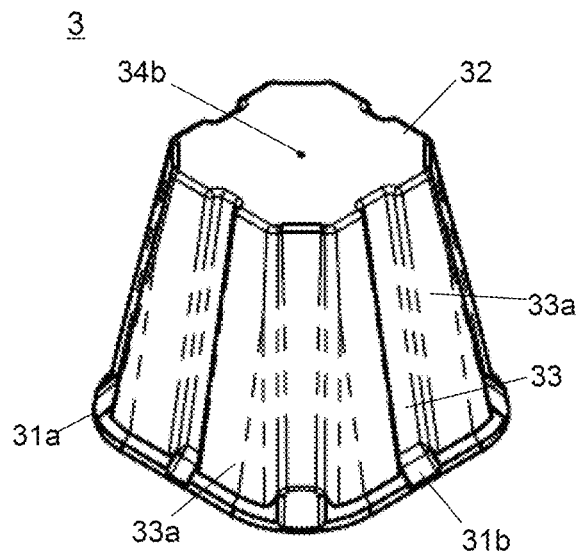
FIG. 10C is a perspective view of a leg of high leg type.
Figure 10D:
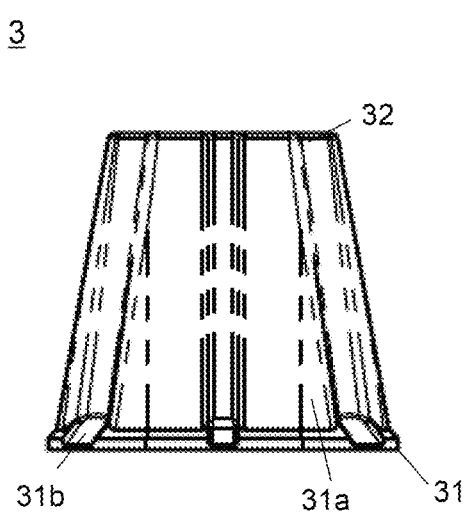
FIG. 10D is a front view.

In the leg molding step, the leg 3 is molded with a predetermined mold. The height of the leg 3 molded in the leg molding step is appropriately set within a range of, for example, 30 mm to 150 mm. The expansion ratio of the leg 3 is appropriately set in a range of approximately 20 to 60 times. Not only the leg 3 having a height (for example, 100 mm) of the standard leg type as shown in FIGS. 8, but also a low leg type (for example, 45 mm) as shown in FIGS. 10A, 10B, and also a high leg type (for example, 150 mm) as shown in FIGS. 10C, 10D are molded using respective mold. By providing such a variation, even if the height of the fork of the forklift or the handlift for conveying the pallet 1 is varied, various legs 3 corresponding to the height can be obtained. In the leg molding step, the fitting concave 34 that fits with the fitting convex 26 is formed on the top surface of the leg 3 (see FIG. 8). At the bottom of the fitting concave 34, the needle hole 34b penetrating to the bottom surface of the leg 3 is formed.

With the conventional manufacturing method of integrally molding the pallet body and the legs, it was not possible to mold the pallet body and the legs mutually having different expansion ratios. On the other hand, according to the manufacturing method of the present embodiment, when the pallet body 2 and the legs 3 are molded separately, not only the combination of the variations of the respective dimensions (thickness, height), but also the combination of the variations of the expansion ratio is also possible. That is, the pallet body and the legs may have the same expansion ratio, or may have different expansion ratios in a combination. This makes it possible to manufacture the pallets under the condition of the most economical amount of raw materials and the most economical time period required for the molding process (molding cycle).

For example, if both the pallet body 2 and the legs 3 have a expansion ratio of 60 times, such a pallet 1 can be obtained, which is lightweight and has excellent performance in cushioning and economy. Further, if the expansion ratio of the pallet body 2 is set to 30 times, the thermal insulation performance can be available. Further, when the expansion ratio of both the pallet body 2 and the legs 3 is set to 20 times, the load resistance is improved, a heavy goods can be conveyed, and a robust pallet 1 can be realized, which is hard to be damaged by the load handling using the forklift.

Moreover, the thickness and expansion ratio of both the pallet body 2 and the legs 3 can be appropriately changed. For example, if the expansion ratio of the pallet body 2 is set to 60 times and the expansion ratio of the legs 3 is set to 20 times, the pallet body 2 itself has a cushioning property, and the legs 3 are hard to be damaged by handling with a forklift. If the expansion ratio of the pallet body 2 is set to 20 times and the expansion ratio of the legs 3 is set to 60 times, such a pallet 1, which can convey heavy goods and have the cushioning property due to the legs 3, can be obtained.

Figure 11A:
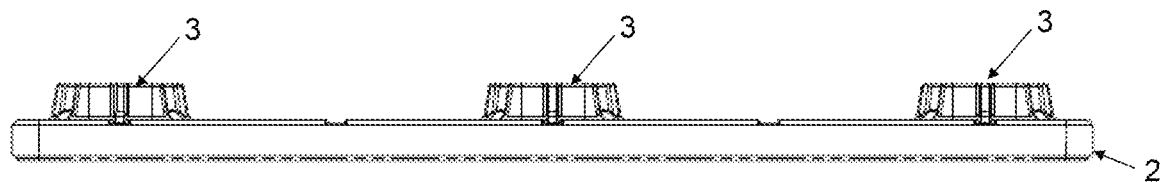
FIG. 11A to FIG. 11D are front views showing examples of combinations of pallet bodies and legs.
Figure 11B:
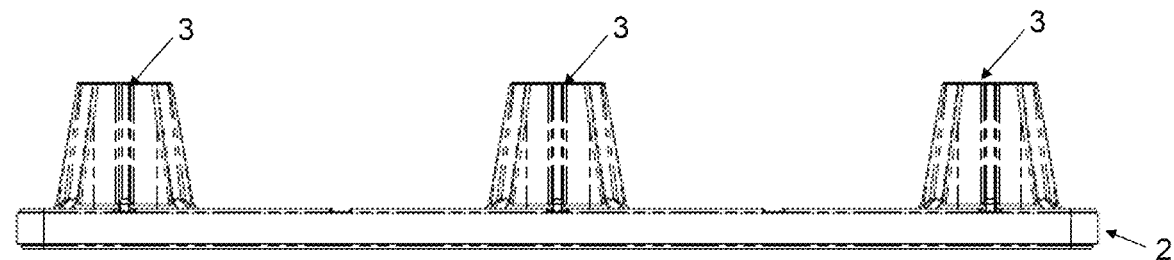
Figure 11C:
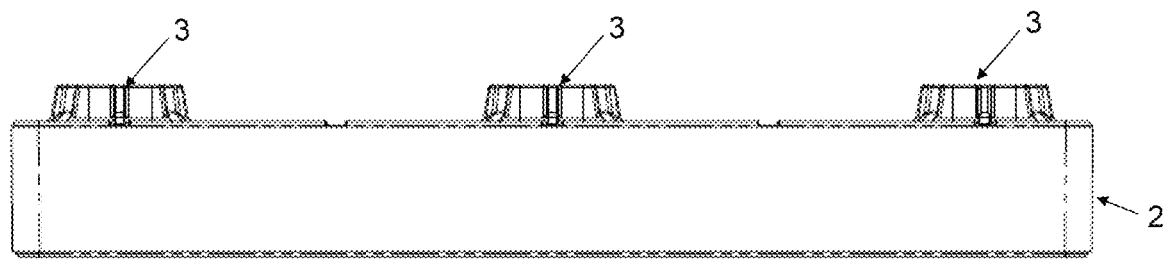
Figure 11D:
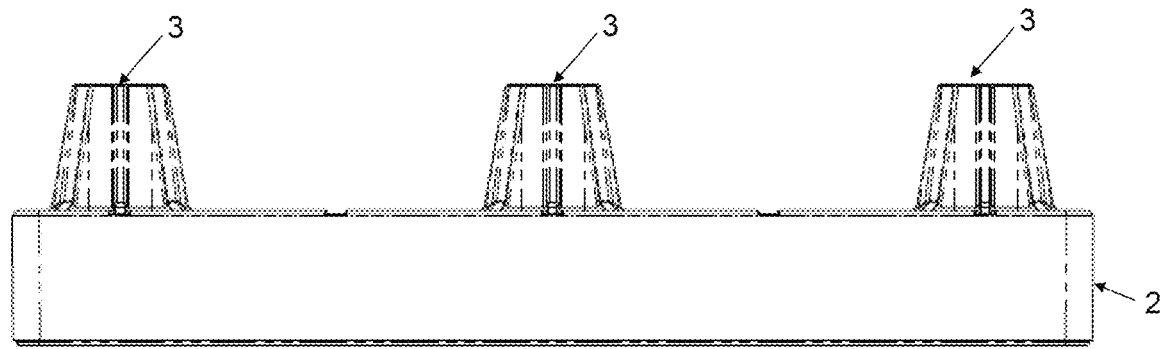

In the vacuum forming step, first, the legs 3 selected from a plurality of types are mounted on the pallet body 2 selected from a plurality of types. As shown in FIGS. 11A to 11D, the pallet body 2 and the legs 3 are appropriately combined. For example, following each combination can be used: a thin type pallet body 2 and a low leg type leg 3 (FIG. 11A); a thin type pallet body 2 and a high leg type leg 3 (FIG. 11B); a thick type pallet body 2 and a low leg type leg 3 (FIG. 11C); and a thick type pallet body 2 and a high leg type leg 3 (FIG. 11D). Alternatively, a standard type pallet body 2 and legs 3 as shown in FIGS. 6 and 8 may be combined. By combining the three types of pallet bodies 2 and the three types of legs 3 exemplified here, nine types of pallets 1 can be manufactured.

As described above, according to the method of manufacturing the pallet 1 of the present embodiment, since the pallet body 2 and the legs 3 are molded separately, pallets 1 of many variations, in which the thickness of the pallet body 2 and the height of the legs 3 are different, can be manufactured with a smaller number of molds than in the case where the pallet body and the legs are integrally molded. Therefore, a plurality of variations of the pallet 1, in which the thickness of the pallet body 2 and the height of the legs 3 are different according to the application, can be manufactured at low cost.

Also, since the pallet body 2 and the legs 3 are separately molded, the molding depth in the mold is smaller than when the pallet body and the legs are integrally molded. Therefore, at the time of molding each member, the steam is easily distributed uniformly to the inside, and uneven heating is unlikely to occur, so that poor fusion hardly occurs. In addition, since the cooling performance is good, swelling due to insufficient cooling can be suppressed. As a result, it is possible to manufacture a high-quality pallet 1 by preventing the detarioration of the strength of the molded product. In addition, the realization of the high quality, using the manufacturing method as described above, contributes to obtaining high durability even though the pallet body 2 is thin.

Furthermore, the legs 3 are required to have particularly high durability because the load is concentrated and the legs 3 are easily damaged by contact with the floor surface or other goods-conveyed. Therefore, it is necessary that the thickness of the legs 3 are configured to be thicker than other components. In the present embodiment, since the fitting concave 34 is formed on the top surface of the leg 3, the wall thickness of the leg 3 around the fitting concave 34 is smaller than that in a case where the fitting concave 34 is not provided, since the molding depth can be reduced due to the fitting concave 34, unevenness in heating can be suppressed and the foam beads can be uniformly fused, and thus a high-quality and durable leg 3 can be manufactured.

Figure 12A:
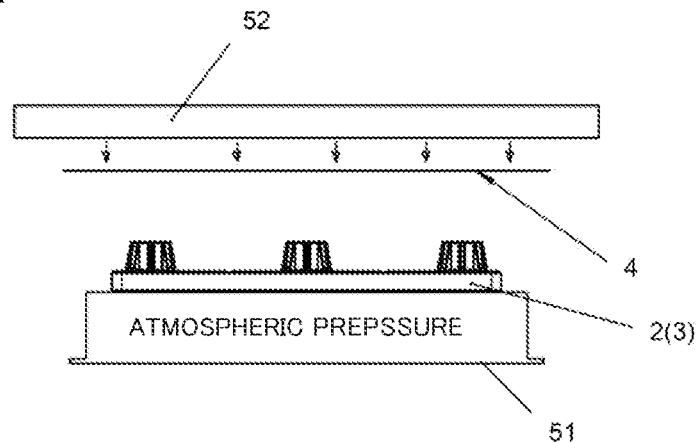
FIG. 12A to FIG. 12D are side views for explaining a vacuum forming step of a resin sheet on the pallet.

In the vacuum forming step, first, as shown in FIG. 12A, a pallet body 2 having a predetermined thickness (standard type in the illustrated example) is prepared. The pallet body 2 is provided with legs 3 whose height (standard type in the illustrated example) is appropriately selected. Next, the pallet body 2 is placed on the top surface of the vacuum chamber 51 so that the bottom surface 22 with the legs 3 faces upward and the top surface 21 having the loading surface 20 faces downward, and then the resin sheet 4 is placed thereon. The heater 52 is disposed above the resin sheet 4, and the heater 52 heats the resin sheet 4 to soften the resin sheet 4.

Figure 12B:
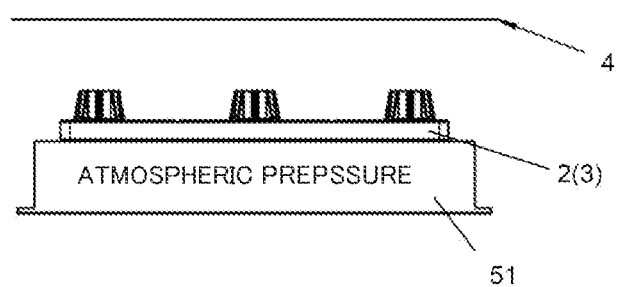
Figure 12C:
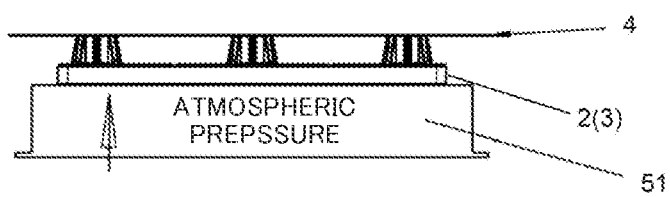
Figure 12D:
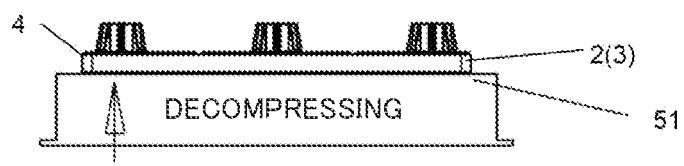

The vacuum chamber 51 is movable upward with the pallet body 2 placed thereon. As shown in FIG. 12B and FIG. 12C, when the resin sheet 4 is softened, the heater 52 is retracted and the vacuum chamber 51 (upper table) is pulled up to bring the pallet body 2 and the resin sheet 4 into contact. The vacuum chamber 51 is provided with suction ports (not shown) communicating between the internal space of the vacuum chamber 51 and the outside on the top surface side of the vacuum chamber 51, and a vacuum pump for decompressing the internal space. When the vacuum chamber 51 brings the pallet body 2 into close contact with the softened resin sheet 4, the vacuum pump is operated, as shown in FIG. 12D, to evacuate the air between the pallet body 2 and the resin sheet 4, and the resin sheet 4 is vacuum-adsorbed to the pallet body 2.

Figure 13A:
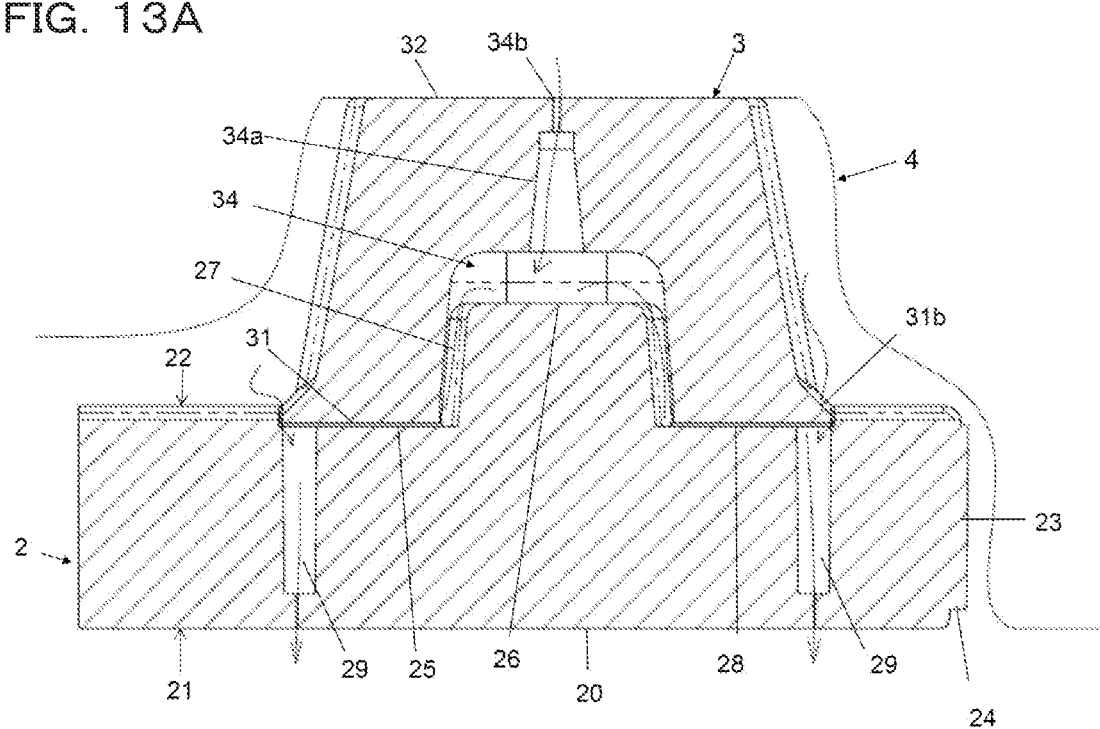
FIG. 13A is a partial cross-sectional view for explaining, in the vacuum forming of the resin sheet, the function of exhaust holes made in the pallet body.

As shown in FIG. 13A, the pallet body 2 is provided with the exhaust holes 29. The exhaust holes 29 can communicate with the fitting concave 34 of the leg 3 through the ventilation grooves 28 and the vertical grooves 27, and the fitting concave 34 is connected to the outside of the installation surface 32 of the leg 3 through the round hole 34a and the needle hole 34b. Although the exhaust hole 29 does not penetrate the top surface 21 of the pallet body 2, the exhaust hole 29 can effectively communicate with the outside of the top surface 21 of the pallet body 2 through slight gaps between the foamed beads because the thickness of that portion is thin. Therefore, when the vacuum chamber 51 is operated to evacuate air from the top surface 21 side of the pallet body 2 so as to decompress, the air between the top surface 21 of the pallet body 2 and the legs 3 and the resin sheet 4 placed thereon is evacuated through the needle hole 34b, the round hole 34a, the fitting concave 34, the vertical grooves 27, the ventilation grooves 28, and the exhaust holes 29. Also, since the thin portion 31b of the flange 31a of the leg 3 is thin, the air between the pallet body 2 and the resin sheet 4 is exhausted through this thin portion, the ventilation grooves 28, and the exhaust hole 29.

Thereby, the top surface 21, the side surface 23, and the outer surface of the legs 3 of the pallet body 2 are covered with the resin sheet 4 without any gap. Further, the resin sheet 4 is not coated on the loading surface 20, which is in contact with the upper table of the vacuum chamber 51, however since the step portion 24 is slightly separated with space from the upper table of the vacuum chamber 51, the resin sheet 4 can enter the space and the step portion 24 is also covered with the resin sheet 4.

Figure 13B:
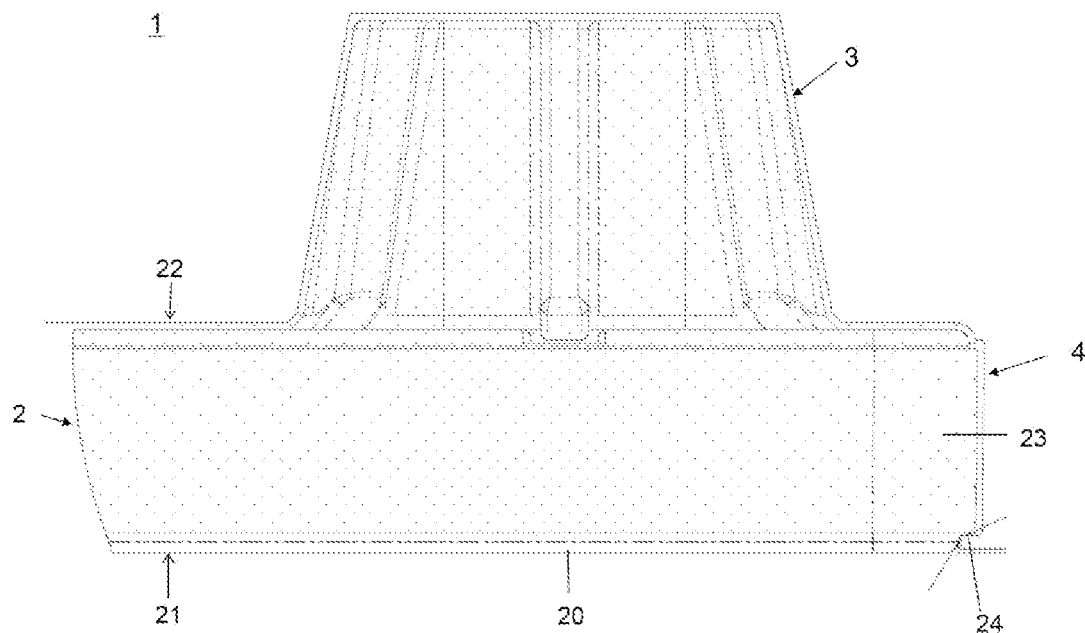
FIG. 13B is a partial side view.

Subsequently, the operation of the vacuum chamber 51 is stopped, the pallet body 2 and others are returned to atmospheric pressure, and the pallet 1 covered with the resin sheet 4 is removed from the top the vacuum chamber 51. At this time, as shown in FIG. 13B, the portion of the resin sheet 4 covering the step portion 24 is stretched, and the sheet thickness of that portion is reduced. Finally, a knife or the like is inserted into the gap between the step portion 24 and the loading surface 20, and the remaining resin sheet 4 is trimmed. In this trimming, since the sheet thickness of the resin sheet 4 where the knife is inserted is thin, trimming can be easily performed. Moreover, since the ridge line part between the step portion 24 and the loading surface 20 is chamfered so as to be a curved surface, it is easy to insert a knife. Thus, a pallet 1 can be obtained, in which the bottom surface 22 of the pallet body 2, the outer surface of the leg 3, the side surface 23 and the step portion 24 of the pallet body 2 are covered with the resin sheet 4, and the loading surface 20 is not covered with the resin sheet 4.

In the pallet 1 configured as described above, since the pallet body 2 constituting the main body is made of foamed resin, it is lightweight, and since the resin sheet 4 is integrally formed on the bottom surface side of the pallet 1 by vacuum integral forming, more surface durability can be obtained compared with the foamed resin constituting the main body 2. Particularly, following surfaces are vulnerable to damage: the surface, among the bottom surface 22 of the pallet body 2, located between the legs 3 into which a fork is inserted; the installation surface 32 of the legs 3, which is placed on a hard installation place such as concrete or asphalt; and the side surface 23 of the pallet body 2 having many opportunities to come into contact with walls and other structures. However, since those surfaces are covered with the resin sheet 4 in the pallet 1, the resin sheet 4 can reduce the damage of those places and ensure the strength of the outer surface.

Further, the pallet 1 is covered with the resin sheet 4 up to the step portion 24 on the top surface 21 side of the pallet body 2. That is, the resin sheet 4 is wound up to the part of the top surface 21 of the pallet body 2, and therefore, for example, as compared with the case where the resin sheet 4 covers only the bottom surface 22 of the pallet body 2 and the legs 3 or at most up to the side surface 23 of the pallet body 2, the resin sheet 4 is hardly peeled off and the durability of the pallet 1 can be improved. Furthermore, since the resin sheet 4 covers only up to the step portion 24 step-downed from the loading surface 20, as the results, for example, the goods-conveyed placed on the loading surface 20 are prevented from coming into contact with the edge of the resin sheet 4, and so the peeling of the resin sheet 4 can be further effectively prevented.

As a matter of fact, the resin sheet 4 has higher thermal conductivity than the foamed beads, and therefore heat is easily transferred to the goods-conveyed directly contacting with the resin sheet 4. Therefore, if both the top surface 21 and the bottom surface 22 of the pallet body 2 are covered with the resin sheet 4 (in the case of a so-called full-laminated type), compared to those not covered with the resin sheet 4, there is a possibility that the advantageous function such as heat insulating property and cushioning property inherent to the foamed resin cannot be fully exhibited. On the other hand, in the pallet 1 of this embodiment, the loading surface 20 is not covered with the resin sheet 4, so the pallet 1 is of half-laminated type, and the loading surface 20 is an exposed surface of the foamed resin (made of foamed beads) which has heat insulating property and cushioning property and forms the pallet body 2. Therefore, the pallet 1 can ensure high heat insulating property that makes it difficult for heat from the road surface or the warehouse floor, etc. to be transferred to the goods-conveyed placed on the pallet 1, and the cushioning property unique to the foamed resin can ensure protection for the goods-conveyed against heat and shock during conveyance. Therefore, it is possible to obtain the pallet 1 having excellent heat insulating property and cushioning property with respect to the placed goods-conveyed while ensuring the strength of the outer surface of the pallet.

Further, since the pallet 1 is provided with exhaust holes 29 at the positions where the legs 3 are arranged on the bottom surface 22 of the pallet body 2, after the resin sheet 4 is formed for covering, the exhaust holes 29 can be hidden. Moreover, since the exhaust holes 29 are provided at the peripheral edge of the fitting concave 25, the decompressing effect around the flange 31a of the leg 3 becomes high, and the resin sheet 4 is more strongly stuck thereto, and the legs 3 and the pallet body 2 can be more firmly fixed. Furthermore, since the exhaust holes 29 do not penetrate to the top surface 21 of the pallet body 2, any large concave is not formed on the loading surface 20, and damage to the loading surface 20 can be suppressed.

It should be noted that the present invention is not limited to the configuration of the above embodiment, and various modifications can be made without departing from the spirit of the invention. Moreover, in the above described embodiment, although the structure of the pallet 1 applies to the example of the conveyance of the goods using the forklift, it is not excluded to apply to another structure made of foamed synthetic resin. Moreover, in the above described embodiment, although the pallet 1 shown is one suitably used with a forklift, however, for example, a pallet of floor-standing type or self-moving type with casters on the bottom surface of the pallet body 2 may be included.

EXPLANATIONS OF LETTERS OR NUMERALS

1 Pallet
2 Pallet body
20 Loading surface
21 Top surface
22 Bottom surface
23 Side surface
24 Step portion
25 Fitting concave
26 Fitting convex
29 Exhaust hole
3 Leg
34 Fitting concave
34b Needle hole
4 Resin sheet

The invention claimed is:

1. A method for manufacturing a pallet having a-pallet body made of foamed resin legs provided on a bottom surface of the pallet body, the method comprising:
   a pallet body molding step for molding pallet bodies with different thicknesses or expansion ratios of foaming preliminarily; and
   a leg molding step for molding, separately from the pallet bodies, legs with different heights or expansion ratios of foaming preliminarily; and
   a vacuum forming step for forming a resin sheet for covering and integrating the pallet body and the legs from a bottom surface side of the pallet by vacuum integral forming after the pallet body and the legs are selected to suit their use, respectively, from the pallet bodies molded by the pallet body molding step and the legs molded by the leg molding step and assembled in a state that the legs are mounted on the pallet body.

2. The method for manufacturing a pallet according to claim 1, wherein,
   in the pallet body molding step, a plurality of fitting convex are formed on the bottom surface of the pallet body, and
   in the leg molding step, a fitting concave that fits with the fitting convex is formed on a top surface of the leg.

3. The method for manufacturing a pallet according to claim 1, wherein, in the pallet body molding step, a loading surface on which goods-conveyed is loaded is formed on a top surface of the pallet body, and a step portion is formed in a shape of down-step from an outer peripheral edge of the loading surface to side surfaces of the pallet body, and in the vacuum forming step, the bottom surface of the pallet body, the legs, the side surfaces of the pallet body and the step portion are covered with the resin sheet, wherein the loading surface is not covered with the resin sheet.

4. The method for manufacturing a pallet according to claim 1, wherein, in the pallet body molding step, an exhaust hole is formed on the bottom surface of the pallet body in a thickness direction of the pallet body at a place where the leg is arranged.

5. The method for manufacturing a pallet according to claim 2, wherein, in the leg molding step, a needle hole penetrating to the bottom surface of the leg is formed at the bottom of the fitting concave.

6. A pallet manufactured by the method for manufacturing a pallet according to claim 1.

* * * * *